US006863603B2

United States Patent
Demerath

(10) Patent No.: US 6,863,603 B2
(45) Date of Patent: Mar. 8, 2005

(54) AIR VENT

(75) Inventor: Michael Demerath, Hüffler (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 10/607,173

(22) Filed: Jun. 26, 2003

(65) Prior Publication Data

US 2004/0127153 A1 Jul. 1, 2004

(30) Foreign Application Priority Data

Jun. 28, 2002 (DE) ..................................... 202 10 038 U

(51) Int. Cl.$^7$ ................................................ B60H 1/34
(52) U.S. Cl. ..................... 454/155; 454/315; 454/322
(58) Field of Search ............................... 454/155, 202, 454/315, 318, 319, 320, 322, 325, 327

(56) References Cited

U.S. PATENT DOCUMENTS

| | | | |
|---|---|---|---|
| 2,969,725 A | * 1/1961 | Grace et al. ................. | 454/155 |
| 3,602,127 A | 8/1971 | Walker et al. | |
| 4,702,155 A | * 10/1987 | Hildebrand et al. ......... | 454/155 |
| 5,722,883 A | * 3/1998 | Schwarz ...................... | 454/155 |
| 5,788,220 A | 8/1998 | Meziere, Sr. | |
| 6,533,655 B2 | * 3/2003 | Demerath et al. ........... | 454/155 |

FOREIGN PATENT DOCUMENTS

| | | | |
|---|---|---|---|
| DE | 2012000 | 2/1971 | |
| DE | 10057421 A1 | 5/2002 | |
| DE | 10121909 A1 | 11/2002 | |
| EP | 192110 A | * 8/1986 | ............ B60H/1/24 |
| EP | 289065 A | * 11/1988 | ............ B60H/1/24 |
| EP | 0888916 A2 | 1/1999 | |

* cited by examiner

Primary Examiner—Harold Joyce
(74) Attorney, Agent, or Firm—Tarolli, Sundheim, Covell & Tummino L.L.P.

(57) ABSTRACT

An air vent for ventilation installations in vehicles comprises a housing (10) which defines an air outlet channel (12), and a manual operating element (24) formed by a partial sphere to adjust direction and flow rate of air delivered by the vent. The operating element (24) is mounted in the housing to be rotatable about two axes perpendicular to each other. The air vent further comprises a first set of blades (18) that are pivotally mounted in the air outlet channel (12) and coupled with each other for joint motion, an actuating arm (28) connected with the operating element (24) and adapted to pivot about one of the two axes, and a coupling link (30) connecting the blades with the actuating arm. The air vent has a second set of blades (20) pivotally mounted in the air outlet channel (12) and coupled with each other for joint motion, a cam disk (32) mounted in the housing to rotate about the other of the two axes and coupled with the operating element for joint rotation, and a pivotal lever (36) mounted in the housing and connecting the second set of blades (20) with the cam disc (32).

8 Claims, 2 Drawing Sheets

AIR VENT

The present invention relates to an air vent for ventilation installations in vehicles, with a housing which has an air outlet channel, and a common operating element for adjusting both of the direction and flow rate of the air delivered by the vent.

An air vent for ventilation installations in vehicles, in which the direction and rate of flow are regulated by a common operating element, is already known from the DE 100 57 421 A1. The operating element is a rotary knob which is rotated to actuate an air flap and is displaced in a translatory manner to pivot two sets of blades perpendicular to each other.

The invention provides an air vent for ventilation installations in vehicles, which likewise has a common operating element for the adjusting of the direction rate of flow. This operating element is formed by a partial sphere rotatable in the housing of the air outlet about two axes perpendicular to each other. Of the operating element, only a ball cap is visible to the user, which is provided with arrow symbols to indicate the rotary mobility. Preferably, the two rotation axes, which are perpendicular to each other, run through the central point of the partial sphere, so that the latter, on actuation, does not alter its position in space. Thereby, new kinds of design possibilities are provided for the panel accommodating the operating element.

By rotation of the operating element about the first of the two axes, a first set of motion-coupled blades are pivoted in the air outlet channel. When this first rotation axis is vertical, the outlet direction of the air stream is shifted laterally. On rotation of the operating element about the second axis, in this case a horizontal axis, a second set of motion-coupled blades is pivoted in the air outlet channel, in order to change the outlet direction between up and down.

In the air outlet channel a flap is pivotally mounted. The flap is movable between an opening position and a closure position. The flap is also actuated by the common operating element. For this, it is coupled to a pivotal lever mounted in the housing, which lever in turn is coupled to a cam disc rotatably mounted in the housing. The cam disc is coupled with the operating element for joint rotation.

Further advantages and features of the invention will be apparent from the following description of a preferred embodiment with reference to the enclosed drawings. In the drawings.

Figure 1:
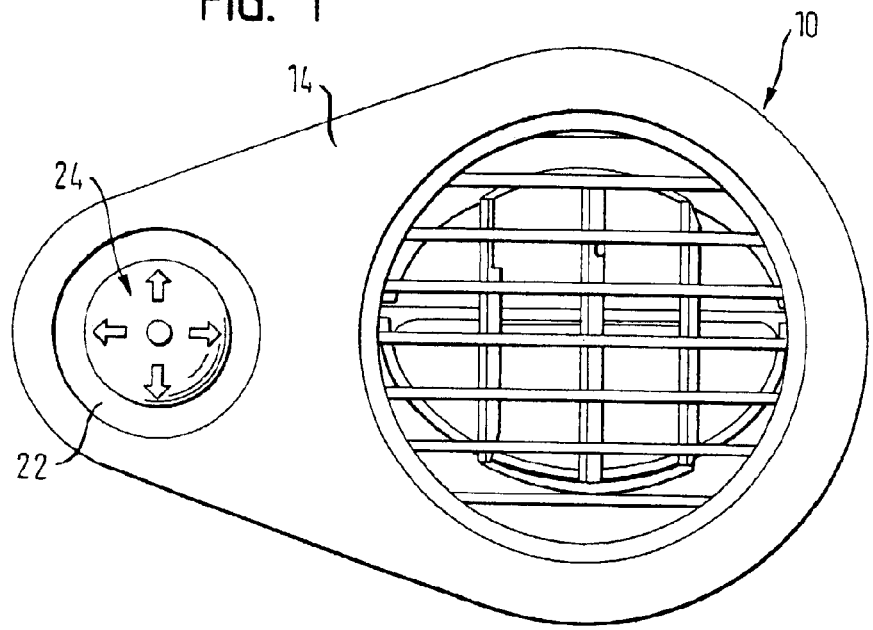
FIG. 1 shows a front view of the air vent.
Figure 2:
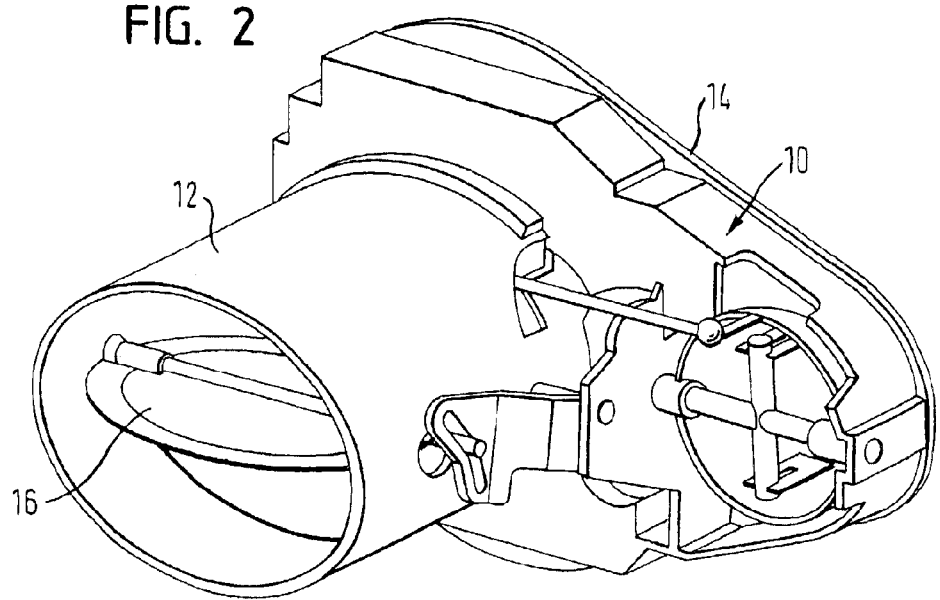
FIG. 2 shows a perspective rear view of the air vent.
Figure 3:
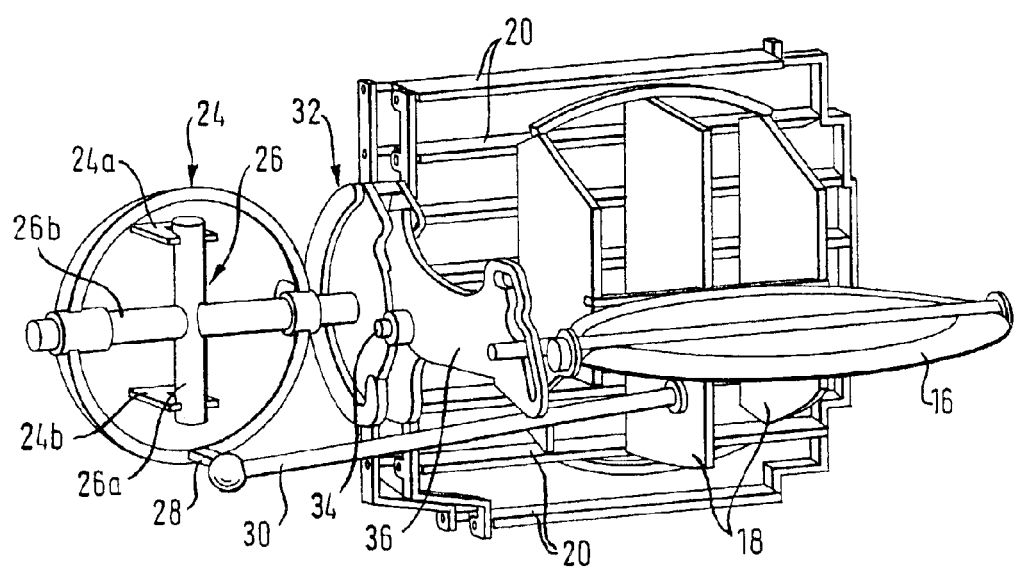
FIG. 3 shows a perspective view of the moving parts of the air vent.

The air vent has a housing, generally designated by 10, formed from plastic, with a cylindrical air outlet channel 12 on the rear face and a shield 14 on the front face. A flap 16 is pivotally mounted in the air outlet channel 12. The flap 16 is movable between an open position and a closure position. Downstream of the flap 16, two sets of parallel, motion-coupled blades are pivotally arranged. The vertical blades 18 are pivotal about vertical axes. The horizontal blades 20 are pivotal about horizontal axes.

In a depression 22 of the shield 14, an operating element 24 is arranged. The operating element 24 is formed by a hollow partial sphere, of which only a ball cap is visible on the side of the shield 14. On this ball cap, arrow symbols are arranged which symbolize the rotatability of the operating element 24.

The operating element 24, in the shape of a partial sphere or a section of a ball, is rotatably mounted in the housing 10 about two axes which are perpendicular to each other. The mounting of the operating element 24 in the housing 10 is brought about by a cross-shaped journal structure 26, which consists of two crossbeams 26a, 26b perpendicular to each other, which intersect each other in the central point of the operating element 24 in the shape of a partial sphere. On the inner face, two bearing arms 24a, 24b are formed on the operating element 24. The bearing arms 24a, 24b embrace the ends of the perpendicular crossbeam 26a and thereby form a rotation bearing for the operating element 24. The intersection of axes 26 is in turn rotatably mounted on the ends of the horizontal rotary beam 26b in the housing 10. For the passage of the horizontal crossbeam 26b, the operating element 24 is provided with lateral cutouts which are wide enough to permit the rotation of the operating element about the vertical axis.

On the outer periphery of the operating element 24, an actuating arm 28 is formed. The actuating arm 28 extends perpendicularly to the plane of the intersection of axes 26 to the rear face of the air vent. At the free end of the actuating arm 28, a coupling rod 30 is connected by means of a ball joint. The coupling rod 30 is connected to the perpendicular blades 18 by means of a further ball joint.

A cam disc 32 is connected for joint rotation with the horizontal crossbeam 26b of journal structure 26. The cam disc 32 is rotatably mounted in the housing 10 via the crossbeam 26b and is provided with a control cam in which a control pin (not shown) runs that is coupled with the horizontal blades 20.

A two-armed pivotal lever 36 is mounted in the housing 10 on a pin 34 and is coupled to the cam disc 32 at its first end via a further control cam of the cam disc 32 and a pin running therein, and at the opposite end with the flap 16. The cam disc 32 with its control cams to actuate the horizontal blades 20 and also the pivotal lever 36 and its coupling to the flap 16 are already known as such from the EP 0 888 916 A2 and are therefore not described here in detail.

By rotation of the operating element 24 about the perpendicular axis corresponding to the crossbeam 26a, the actuating arm 28 is pivoted, in order to laterally pivot the vertical blades 18 via the coupling rod 30.

By rotation of the operating element 24 about the horizontal axis corresponding to the crossbeam 26b, firstly the cam disc 32 is rotated. By rotation of the cam disc 32, the horizontal blades 20 are pivoted. Depending on the design of the control cams on the cam disc 32 and on the pivotal lever 36, at the same time the flap 16 is also pivoted. Preferably the control cams are designed so that the flap 16 is pivoted to its closure position, when the blades 20 are directed downwards and are almost closed. If required, the flap 16 can also assume a closure position in the opposite end position of the blades 20.

It can therefore be seen that solely by rotation of the operating element 24 about two axes perpendicular to each other and without changing the position in space of this operating element, both sets of blades 18, 20 and also the flap 16 can be actuated.

What is claimed is:

1. An air vent for ventilation installations in vehicles comprising a housing which defines an air outlet channel, and a manual operating element formed by a partial sphere to adjust direction and flow rate of air delivered by the vent said operating element being mounted in the housing to be rotatable about two axes perpendicular to each other wherein the operating element is mounted in the housing by means of a cross-shaped journal structure.

2. The air vent according to claim 1, wherein a first crossbeam of the journal structure has outer ends rotatably mounted in the housing and the operating element is rotatably mounted on the outer ends of the second crossbeam of the journal structure.

3. The air vent according to claim 1, wherein the member operating element is hollowed out in a dish shape.

4. The air vent according to claim 3, wherein the dish-shaped operating element has formed-on bearing arms and the bearing arms have free ends that embrace the outer ends of the second crossbeam.

5. An air vent for ventilation installations in vehicles comprising a housing which defines an air outlet channel and a manual operating element, said operating element being formed by a partial sphere, said partial sphere being mounted in said housing to be rotatable about a first axis and about a second axis and said first and second axes being perpendicular to each other, said air vent further comprising a first set of blades being pivotally mounted in said air outlet channel for adjusting direction of air delivered by said air vent and being coupled with each other for joint motion, a second set of blades being pivotally mounted in said air outlet channel for adjusting direction of air delivered by said air vent and being coupled with each other for joint motion, and a flap being pivotally mounted in said air outlet channel between an open position and a closure position to adjust the flow rate of air delivered by said air vent, a rotation of said partial sphere about said first axis pivoting said first set of blades and a rotation of said partial sphere about said second axis pivoting both said second set of blades and said flap.

6. The air vent, according to claim 5, further comprising an actuating arm connected with said operating element and adapted to pivot about said first axis and a coupling link connecting said first set of blades with said actuating arm.

7. The air vent according to claim 6, further comprising a cam disk mounted in said housing to rotate about said second axis, said cam disk being coupled with said operating element for joint rotation and with said second set of blades.

8. The air vent according to claim 7, further comprising a control flap being pivotally mounted in said air outlet channel and being coupled to a pivotal lever mounted in said housing, said pivotal lever being coupled to said cam disk.

* * * * *

UNITED STATES PATENT AND TRADEMARK OFFICE
CERTIFICATE OF CORRECTION

PATENT NO. : 6,863,603 B2 Page 1 of 1
APPLICATION NO. : 10/607173
DATED : March 8, 2005
INVENTOR(S) : Michael Demerath It is certified that error appears in the above-identified patent and that said Letters Patent is hereby corrected as shown below:

Title Page (73) Assignee, delete "TRW Automotive Electronics & Components GmbH & Co. KG, Radolfzell (DE)" And insert --TRW Automotive Electronics & Components GmbH & Co. KG, Enkenbach-Alsenborn (DE)--.

Signed and Sealed this

Thirtieth Day of October, 2007

JON W. DUDAS
*Director of the United States Patent and Trademark Office*